ated July 5, 1955

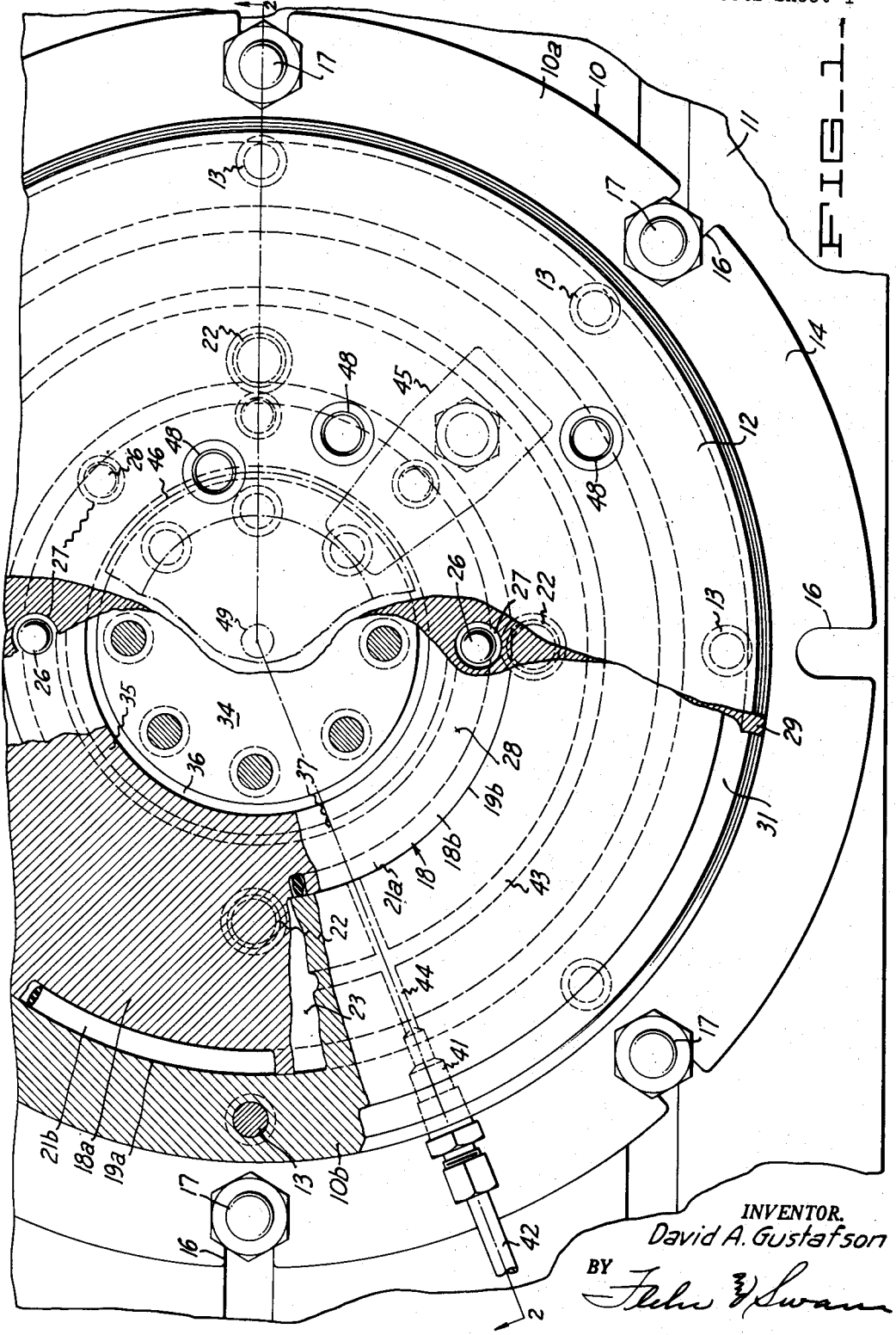

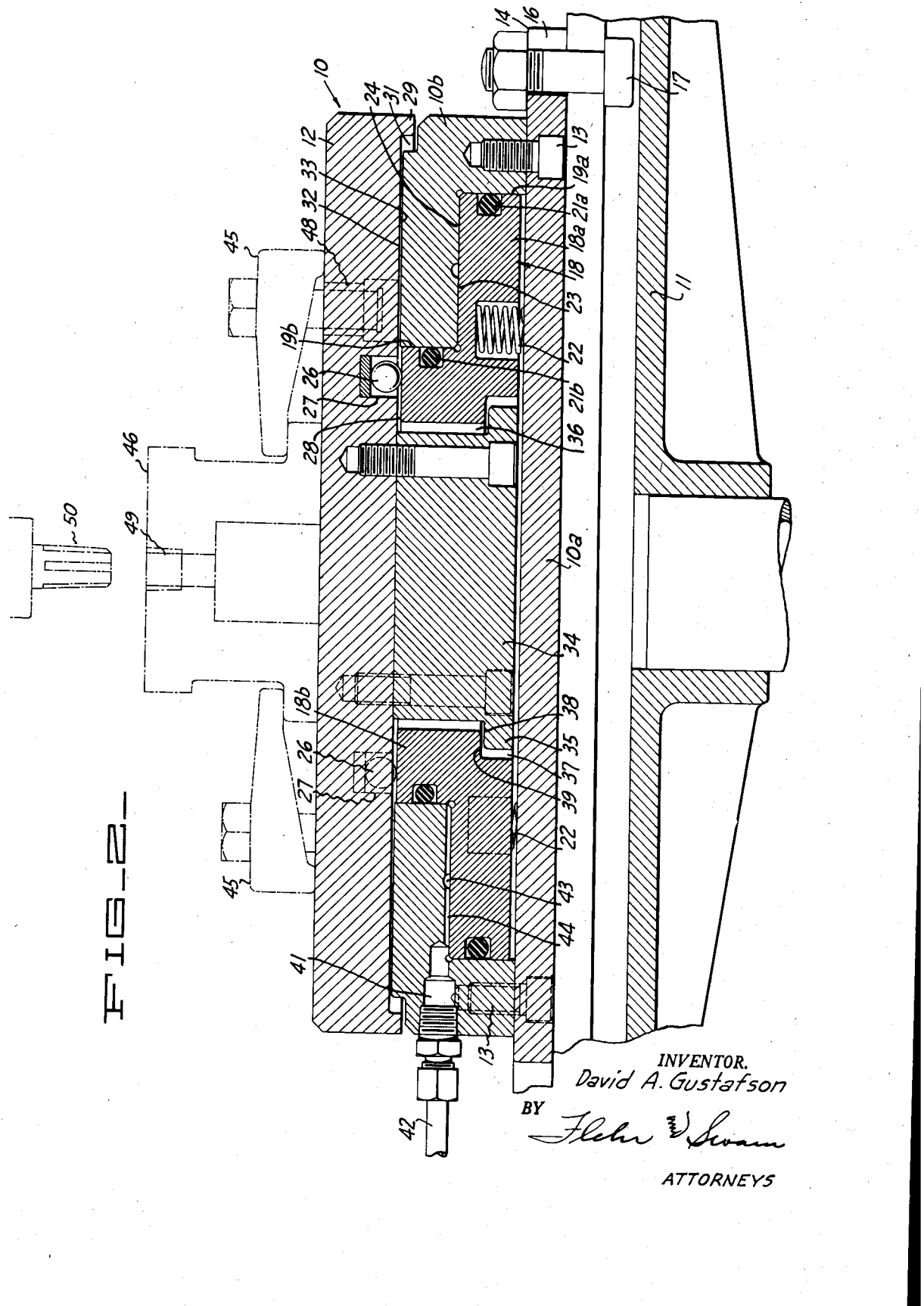

2,712,248

FIXTURE FOR MACHINE OPERATIONS LIKE TAPPING

David A. Gustafson, Oakland, Calif., assignor to Grove Valve and Regulator Company, Oakland, Calif., a corporation of California Application September 29, 1951, Serial No. 248,949

4 Claims. (Cl. 77—63)

This invention relates generally to fixtures for machine operations, and is particularly useful for operations in which it is necessary to center a work piece with respect to a threading tap, or like rotating tool.

In machine tapping operations it is customary shop practice to align the hole to be tapped with the axis of the threading tap, after which the work piece is clamped to the supporting table of the machine and the tap lowered into the hole. The alignment of the hole with the axis of the threading tap requires considerable skill and is time consuming. The customary procedure is to lower the tap until its end seats upon the upper edge of the hole, with rearrangement of the work piece until there is proper alignment. Thereafter the work piece is clamped to the supporting table to maintain alignment and to resist the torque of the tap while the threading operation is being completed. Fixtures have been devised in an effort to simplify these operations. Thus a pantograph type of mechanism has been used for attaching between the work piece and the table of the machine, together with mechanical clamping means which serves to hold the work in a fixed position after it has been properly aligned. Fixtures of this type are relatively expensive and they are not as simple or convenient to operate as is desired.

It is an object of the present invention to provide a fixture of simple construction and mode of operation, which greatly facilitates aligning operations such as described above.

Another object of the invention is to provide a fixture of the above character which can be readily adapted to a variety of machines where the problem of aligning and fixing the work piece is involved.

Another object of the invention is to provide a fixture of the above character which has all of its working parts enclosed, and which can be operated from a remote point, as for example by a foot pedal.

Additional objects and features of the invention will appear from the following description in which the preferred embodiment of the invention has been set forth in detail in conjunction with the accompanying drawing.

Referring to the drawing:

Figure 1 is a partial plan view partly in section illustrating a fixture incorporating the present invention.

Figure 2 is a cross-sectional detail taken along the line 2—2 of Figure 1.

The fixture illustrated in the drawing consists generally of a base 10 which is adapted to be clamped to the working table 11 of a machine. Extending over the top of the base 10 there is a plate 12 which is adapted to support the work piece.

For convenience, base 10 and also the plate 12 can be made circular in contour as illustrated in Figure 1. The base can be made in two parts, including the bottom plate 10a, and the body part 10b, which are secured together by suitable means such as the screws 13. The plate 10a provides a flange 14 which can be provided with circumferentially spaced slots 16 for accommodating the clamping bolts 17.

Within the body part 10b there is an operating piston 18. This piston consists of two connected portions 18a and 18b which are formed on two different diameters as illustrated, and which fit within the two bores 19a and 19b, which are formed in the body part 10b. Both piston portions are sealed with respect to the body by suitable means such as the resilient O rings 21a and 21b.

Suitable means such as the compression springs 22 serve to urge the piston in one direction. Thus the normal position of the piston as illustrated in Figure 2 is such that the annular face 23 of the piston portion 18a is in direct contact with the opposed annular face 24 of the body part 10b.

The plate 12 is normally supported in such a manner that it can be moved a limited amount in any direction relative to the base. Thus a plurality of balls 26 are accommodated within the retaining recesses 27, and engage the upper flat annular face 28 formed on the piston 18. The periphery of the plate 12 is provided with a depending skirt or flange 29, which is accommodated by the recess 31. With the piston 18 in its raised position, illustrated in Figure 2, a small clearance exists between the lower clamping face 32 of the plate 12 and the upper annular clamping face 33 of the body part 10b. The flange 29 serves to prevent entrance of dirt, cutting oil, or other foreign material between the clamping faces 32 and 33.

A hub 34 is mounted upon the central portion of the plate 12, and extends downwardly through the central opening 36, in the piston 18. The lower end of the hub is provided with a flange 35, which is accommodated in an annular recess 37 formed in the piston. Sufficient clearance is provided between the hub and the piston to permit the desired movement of the plate 12 with respect to the base, as previously described. The flange 35 presents an annular face 38 in close proximity with an opposed face 39, formed on the piston.

One side of the body part 10b is provided with an opening 41 which provides a passage for making connection with the pipe or tube 42. This pipe extends to a control valve, which in turn connects with a source of air or other fluid under pressure. The control valve is arranged whereby when it is moved to one operating position, air or other fluid under pressure is applied to the pipe 42 and passage 41. When the control valve is moved to its other position communication with the source of fluid pressure is interrupted, and pipe 42 is vented to the atmosphere. The passage 41 communicates with the space between the opposed surfaces 23 and 24 of the piston 18 and body part 10b respectively. Thus the surface 24 is shown interrupted by the circular groove 43, and this groove is connected by duct 44 with the passage 41.

Operation of my fixture can be described as follows: In a typical instance the fixture is mounted in horizontal position upon top of the supporting table 11. The work piece 46 is clamped to the plate 12 by suitable clamps 45 or a suitable vise, and to facilitate application of suitable clamping devices, the plate 12 has been shown provided with a plurality of tapped openings 48. The work piece is clamped in a position whereby the hole 49 to be threaded is not greatly displaced from the vertical axis of the tap 50. The work piece, together with the table 12, can now be freely turned or moved a limited amount in a horizontal direction to bring the center of the hole 49 into exact alignment with the axis of the tap. This operation can be simplified by lowering the tap until it seats within the upper end of the hole 49, while at the same time manually shifting the plate 12 to obtain proper alignment. The control valve is then operated to apply fluid under pressure to the pipe 42, whereby the piston 18 is forced downwardly with respect to the body part 10b. This serves to bring the annular faces 38 and 39, and also the surfaces 32 and 33, into direct clamping engagement. By virtue of this clamping engagement the plate 12 is firmly fixed to the base, and the operator may now proceed with the tapping operation. After the hole 49 has been threaded and the tap has been retracted, the operator returns the control valve to its other operating position, whereby pipe 42 is vented to the atmosphere, and the parts returned to the position illustrated in Figure 2. The plate 12 is now free for limited movement in a horizontal direction for the aligning of a new work piece.

It will be evident from the foregoing that I have provided a fixture having a relatively simple mechanical construction and mode of operation. The device requires a minimum number of working parts, and all of the working parts are enclosed within the base structure. Operation of the fixture requires no particular skill on the part of the operator, and the control valve can be conveniently located wherever desired, as for example, below the work table of the machine in position to be operated by a foot pedal. When fluid pressure is not applied, the work supporting plate 12 moves with a minimum of friction, thus facilitating aligning movements. After pneumatic pressure has been applied the plate is securely held to the base to adequately resist the torque of the rotating tap, and this is determined by the pressure of the applied fluid rather than by a human factor. The clamping force is applied only in a downward direction and involves a minimum amount of vertical movement of the plate. Thus there is no tendency for misalignment to occur after the fluid pressure is applied.

I claim:

1. In a fixture of the character described, a base adapted to be fixed to the supporting table of a machine, said base being bored on two separate concentric diameters, a piston having two axially displaced portions formed on two different diameters and adapted to fit within the base, means for sealing the two portions of the piston relative to the base, means for applying fluid under pressure to one side of said piston to cause the same to move in one direction, a work supporting plate carried by the base, said plate having limited freedom of movement relative to the base, means forming a shoulder secured to said plate, said piston having an annular shoulder face disposed in opposed proximity with said first named shoulder face, movement of said piston responsive to application of fluid under pressure serving to force said shoulder faces together to clamp said plate in fixed relation with the base.

2. A fixture as in claim 1 together with spring means for urging said piston in a direction opposite to the direction in which the piston is removed by application of fluid under pressure.

3. A fixture as in claim 1 in which a hub is secured to the plate and in which the piston has an opening to loosely accommodate the hub, the hub having a flange forming one of said shoulder faces.

4. A fixture as in claim 2 together with a journal interposed between the piston and said plate to support said plate for movement relative to the base in the general direction of the plane of the base.

References Cited in the file of this patent

UNITED STATES PATENTS

| | | |
|---|---|---|
| 1,397,771 | Mort | Nov. 22, 1921 |
| 1,690,541 | Kuzelewski | Nov. 6, 1928 |
| 1,746,886 | Chipperfield | Feb. 11, 1930 |